United States Patent
Downs, Jr.

(10) Patent No.: US 7,092,561 B2
(45) Date of Patent: *Aug. 15, 2006

(54) CHARACTER RECOGNITION, INCLUDING METHOD AND SYSTEM FOR PROCESSING CHECKS WITH INVALIDATED MICR LINES

(75) Inventor: Charles H. Downs, Jr., Norman, OK (US)

(73) Assignee: Advanced Financial Solutions, Inc., Oklahoma City, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 10/631,262

(22) Filed: Jul. 31, 2003

(65) Prior Publication Data

US 2004/0076320 A1  Apr. 22, 2004

Related U.S. Application Data

(63) Continuation of application No. 09/518,424, filed on Mar. 3, 2000, now Pat. No. 6,654,487.

(51) Int. Cl.
*G06K 9/00* (2006.01)
*G06K 9/74* (2006.01)

(52) U.S. Cl. ..................... 382/139; 382/310

(58) Field of Classification Search ............... 382/137, 382/138, 139, 140, 310, 318
See application file for complete search history.

(56) References Cited

U.S. PATENT DOCUMENTS

| | | | |
|---|---|---|---|
| 3,764,978 A * | 10/1973 | Tyburski et al. | 340/146.3 D |
| 3,949,363 A | 4/1976 | Holm | 340/146.3 D |
| 3,988,571 A | 10/1976 | Blair et al. | 235/61.9 R |
| 4,027,142 A | 5/1977 | Paup et al. | 235/61.9 R |
| 4,103,617 A | 8/1978 | O'Brien et al. | 101/93.03 |
| 4,205,780 A | 6/1980 | Burns et al. | 235/454 |
| 4,315,246 A | 2/1982 | Milford | 340/146.3 D |
| 4,408,342 A | 10/1983 | Grabowski et al. | 382/9 |
| 4,555,617 A | 11/1985 | Brooks et al. | 235/379 |
| 4,876,735 A * | 10/1989 | Martin et al. | 382/57 |
| 4,888,812 A | 12/1989 | Dinan et al. | 382/7 |
| 5,077,805 A | 12/1991 | Tan | 382/7 |
| 5,119,433 A | 6/1992 | Will | 382/7 |
| 5,146,512 A | 9/1992 | Weideman et al. | 382/30 |
| 5,359,667 A | 10/1994 | Borowski et al. | 382/7 |
| 5,754,673 A | 5/1998 | Brooks et al. | 382/112 |
| 5,754,674 A | 5/1998 | Ott et al. | 382/112 |
| 5,832,140 A | 11/1998 | Stapleton et al. | 382/298 |

(Continued)

OTHER PUBLICATIONS

Publication entitled "BofA Is Doubtful No-Check Plan," *The American Banker*, 2 pages (Apr. 10, 1979).

(Continued)

*Primary Examiner*—Andrew W. Johns
(74) *Attorney, Agent, or Firm*—McAfee & Taft (57) ABSTRACT

An automated analysis method and tool for a digitally imaged financial item can digitally recognize a plurality of characters across an area of a digital image containing character indicia at predetermined positions in the area and also possibly containing non-character indicia in the area. This finds exemplification in an automated check processing method and check sorting system in which a check's MICR line that has been read and interpreted as invalid can be digitally analyzed, via a digital image of the check, to identify MICR characters that could not be validly read or interpreted by the conventional MICR processing equipment. This includes digitally applying character recognition processing to an invalidated MICR line in a digital image of the financial item (e.g., a check). Previously invalidated MICR line data can then be corrected.

26 Claims, 8 Drawing Sheets

U.S. PATENT DOCUMENTS

| | | |
|---|---|---|
| 5,963,659 A | 10/1999 | Cahill et al. ................. 382/139 |
| 6,023,534 A | 2/2000 | Handley ..................... 382/275 |
| 6,243,504 B1 | 6/2001 | Kruppa ....................... 382/318 |
| 6,654,487 B1 * | 11/2003 | Downs, Jr. .................. 382/139 |
| 6,661,910 B1 | 12/2003 | Jones et al. ................. 382/135 |
| 6,863,214 B1 * | 3/2005 | Garner et al. ............... 235/379 |

OTHER PUBLICATIONS

Hans P. Graf et al., Internet Web page article entitled "Analysis of Complex and Noisy Check Images," www.research.alt.com, *AT&T Bell laboratories*, 9 pp. (1995).

* cited by examiner

CHARACTER RECOGNITION, INCLUDING METHOD AND SYSTEM FOR PROCESSING CHECKS WITH INVALIDATED MICR LINES

RELATED U.S. APPLICATION DATA

This Application is a continuation of Application Ser. No. 09/518,424 filed on Mar. 3, 2000 now U.S. Pat. No. 6,654,487.

REFERENCE TO COMPUTER PROGRAM LISTING APPENDIX

Incorporated herein by reference is the material contained on the compact disc filed in the parent case. Two duplicate compact discs have been submitted, each containing one (1) file named 32995.txt and created Jul. 22, 2003. The file size is 130,461 bytes. The file is an optical character recognition and manual reproduction of the program listing filed as part of the present original application.

BACKGROUND OF THE INVENTION

This invention relates generally to computer-implemented methods for digitally recognizing a plurality of characters across an area of a digital image containing character indicia at predetermined positions in the area and also possibly containing non-character indicia in the area. The invention relates particularly to an analysis method and tool for a digitally imaged financial item, such as a check having a MICR line, and even more particularly to a check processing method and a check sorting system.

Although the present invention has broader aspects referred to above, the invention will be described in the context of handling financial items, specifically checks which have along their lower portions indicia-containing areas referred to as "MICR lines." Referring to FIG. 1, a conventional check 2 has various conventional portions. These include the illustrated date, payee, numerical and alphabetical amount, memo, and signature areas. Typically other information is preprinted on the check as well (e.g., account holder identification information such as name and address, and bank name). The check 2 also includes a MICR line 4. "MICR" stands for Magnetic Ink Character Recognition, and the acronym is used in this specification and the claims as an adjective to designate conformance or compliance with fonts and formats used in magnetic ink character recognition technology.

Figure 1:
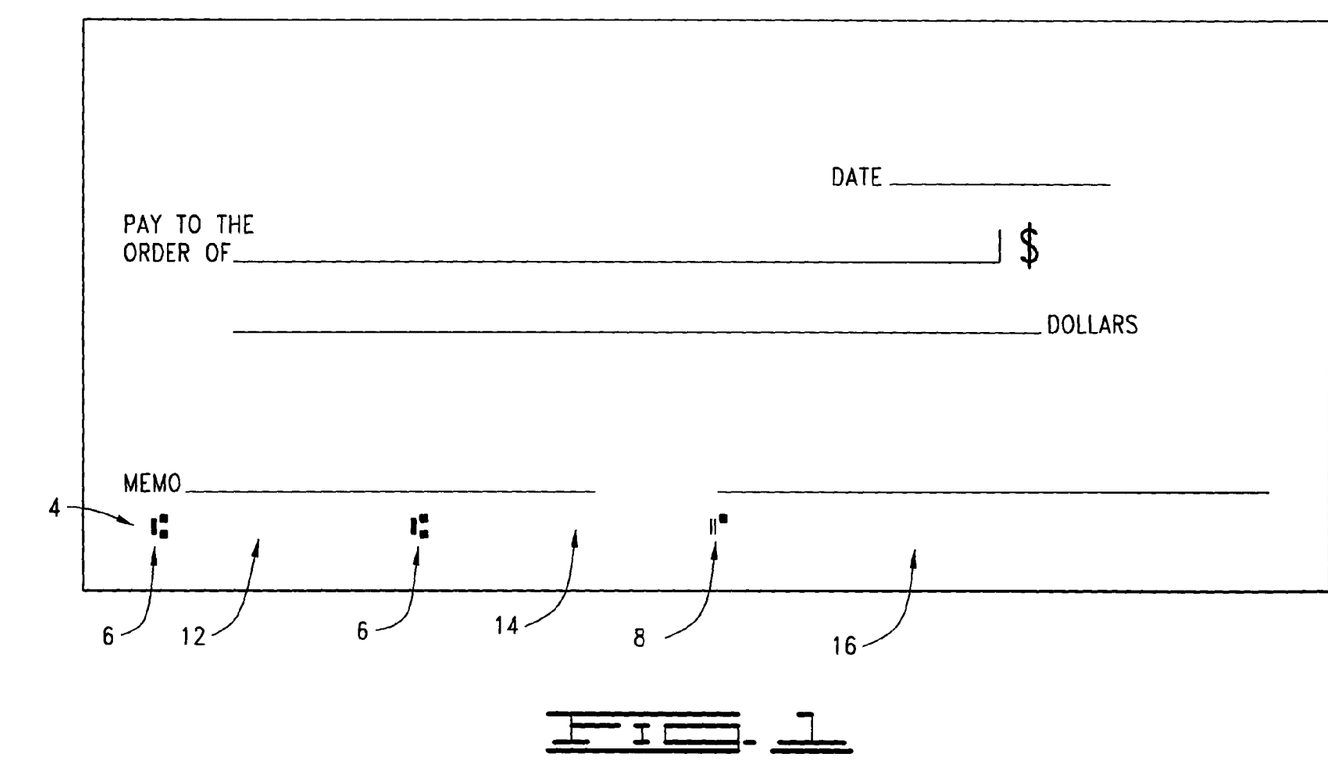
FIG. 1 illustrates a conventional check.
Figure 2:
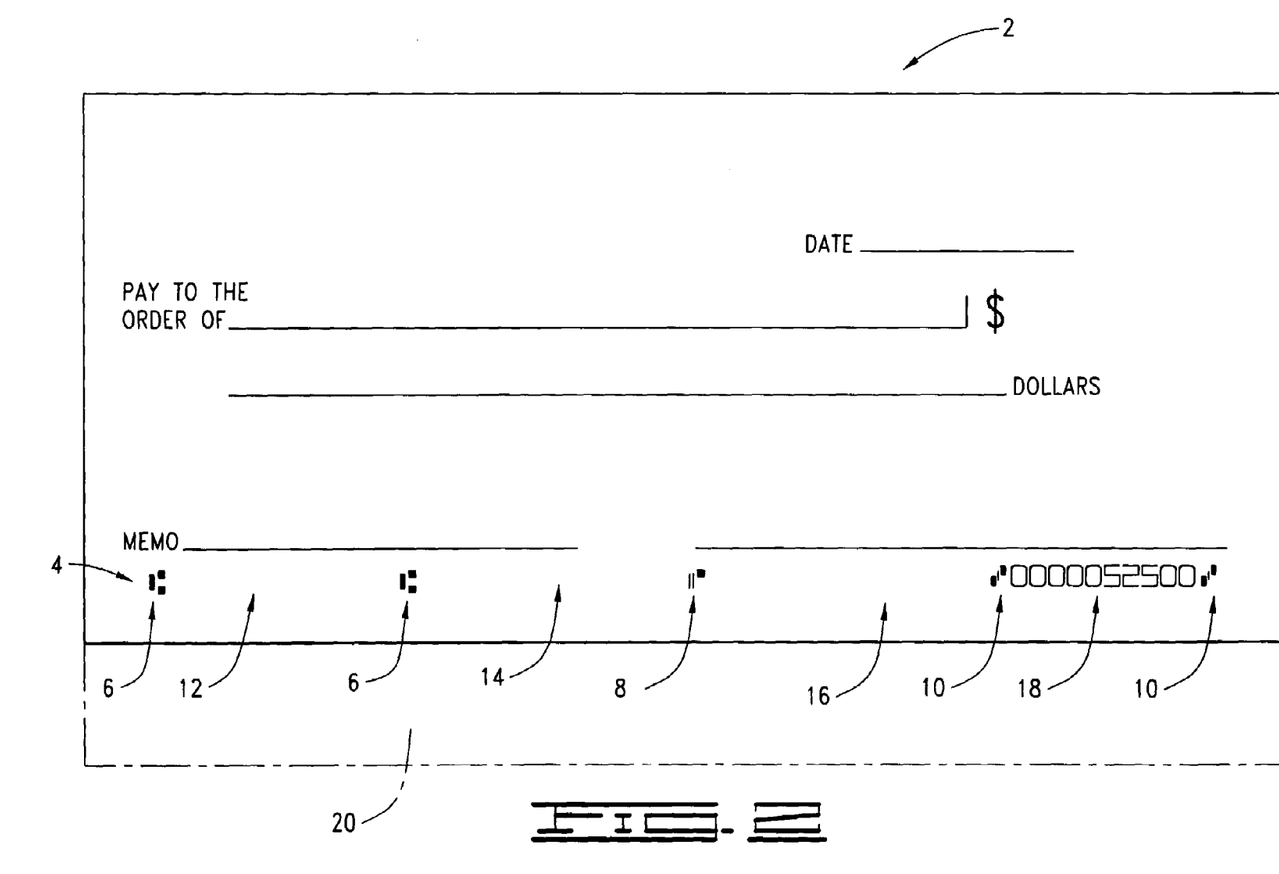
FIG. 2 illustrates a conventional check marked with additional MICR symbols indicating the amount of the check, and the drawing also shows in dot-dash lines a reject repair strip attached to the check.

With regard to MICR lines and characters used on checks in the United States, the symbol set includes numerals 0 through 9, a financial institution designation symbol 6 shown in FIG. 1, an individual account number designation symbol 8 shown in FIG. 1, an amount designation symbol 10 shown in FIG. 2, and a hyphen (not shown). On the check shown in FIG. 1, two symbols 6 define the limits of a portion 12 of the MICR line 4 within which a nine-digit financial institution identification number in MICR numerals (not shown) is preprinted on the check 2. The symbol 8 delimits to the right (as viewed in FIG. 1) a portion 14 of the MICR line 4 within which a nine-digit individual account number in MICR numerals (not shown) is preprinted on the check 2. To the right (as viewed in FIG. 1) of the symbol 8 is a portion 16 of the MICR line 4 in which the check number is preprinted in MICR format (not shown). During processing of the check subsequent to it being used by the account holder to draw on the holder's account, the symbols 10 and a ten-digit number in MICR format are printed in portion 18 of MICR line 4 shown in FIG. 2 to indicate the amount of the check (the number shown illustrates certain MICR numeral forms, and it represents a check amount of $525.00).

During the time between when the account holder uses the check 2 and when it is returned to him or her as a canceled check with the account holder's monthly bank statement, for example the check may go through various check handling processes. These can be at a bank, at a Federal Reserve facility, or at a third-party check-handling facility, for example. One of these processes will be described as one context in which the present invention has utility.

In this check processing, a check sorter transports individual checks from a batch of checks at the input of the sorter to respective receptacles, referred to as pockets, at the output of the sorter. Along the way in the sorter, the MICR line is read and a digital image of the front and possibly back of the check is made. Other functions may be performed; however, the MICR line reading and the digital imaging are of particular significance to the present invention. The electrical signals generated by reading the MICR line are conducted or otherwise transmitted to a computer programmed to determine if the read MICR line is valid or invalid, and the electrical signals representing the digitized image are conducted or otherwise transmitted to a database providing a repository of digital images of the processed checks. The foregoing is known in the art.

If the programmed computer determines that the read MICR line is valid (as defined by programmed rules), it outputs control to the sorter to put the respective check in an appropriate pocket (e.g., a pocket designated for the financial institution whose identification number is in the MICR line). If the programmed computer determines that the read MICR line is not valid, it may control the sorter to send the respective check to the "reject" pocket. Some reasons why a MICR line might be deemed invalid include: bad print of the magnetic substance to form the MICR symbols (whether the numerals or the designators), misorientation of the check in the sorter, correction tape placed over the MICR line, sorter mishandling, ferrous or magnetic quality to signature ink or other marking made on the check in the MICR line area (e.g., random marks 22 or letters 24 impinging on MICR line 26 illustrated in FIG. 3), and the check having a reject repair strip (a reject repair strip 20 is illustrated in dot-dash lining in FIG. 2; this is adhered to the bottom of the main check body and it has similar MICR encoding to that found in the conventional MICR line 4 on the main check body, as known in the art). In either event (i.e., either a validated read or an invalidated read), the database is updated to include the digital image of the processed check and to include the valid or invalidated information about the check's MICR line.

Valid MICR reads usually occur in the aforementioned automated process; however, even a small percentage of invalidated MICR reads can impose a significant cost. For example, one type of check sorter may process one million items (checks) each day. A reject, or invalidated MICR line read, rate of only 1.5% results in 15,000 rejected items per day for such a sorter. Presently, these rejected items are taken from the reject pocket of the sorter and manually processed by key entry personnel, who manually handle the rejected checks, read the MICR line information, and type the numerical information into the system computer(s) to provide the correct MICR line information. A highly efficient key entry person may be able to manually process five hundred rejected checks per hour; therefore, in this example, manually processing 15,000 checks per day would require thirty hours of personnel time each day if all personnel were able to handle five hundred rejects per hour. Of course with manual entry by humans, there is the possibility of data entry error. Clearly, the manual handling of invalidated MICR line items is time-consuming and expensive. Thus, there is the need for automating the processing of checks which have been deemed to have invalid MICR lines. This includes the need for automatically correcting the invalidated MICR line information in its database. A broader need is to provide for automating character recognition (and preferably correction) of character indicia of predetermined characteristic at predetermined positions as distinguished from other markings referred to as non-character indicia (which may in fact be characters, but not of the same predetermined characteristic).

SUMMARY OF THE INVENTION

The present invention meets the aforementioned needs by providing an automated analysis method and tool for a digitally imaged financial item, such as a check having a MICR line. The present invention provides a computer-implemented method for digitally recognizing a plurality of characters across an area of a digital image containing character indicia at predetermined positions in the area and also containing non-character indicia in the area. The present invention also provides a check processing method and a check sorting system. In the particular context of processing checks which have been previously read and deemed to have an invalid MICR line, the present invention results in reduced manual data entry to correct for invalidated MICR line reads, in faster posting of financial information related to processing the checks, and in reduced errors.

The present invention includes a financial item analysis method comprising digitally applying character recognition processing to an invalidated MICR line in a digital image of a financial item. If the financial item is a check, this method may further comprise processing the check through a check sorter. Such check processing includes sensing the check for a MICR line and characters therein, determining the check has an invalidated MICR line, and creating a digital image of the check. If such check processing is performed, the aforementioned "digitally applying character recognition processing" may be performed after the aforementioned sensing, determining, and creating; however, the method of the present invention can also be used in making a determination about the validity or invalidity of a MICR line. The method can further include changing the digitally stored MICR line data for the financial item (e.g., check) in response to digitally applying character recognition processing to the invalidated MICR line in the digital image of the financial item.

As applied specifically to checks, the present invention can be defined as a check analysis method comprising: digitally processing a digital image of a check to search for a digital image of a MICR line of the check; and digitally changing the orientation of the digital image of the check in response to at least one failure of the digitally processing of the digital image of the check to find a digital image of the MICR line. Another definition as a check analysis method comprises: using a first MICR font template to identify MICR characters across the length of a selected area of the digital image of the check; detecting a position for a MICR character not identified by the first MICR font template relative to at least one MICR character identified by the first MICR font template; and in response to detecting a position for a MICR character not identified by the first MICR font template, using at least a second MICR font template to identify the MICR character in the detected position. The foregoing can be used with regard to financial items in general in the definition of the financial item analysis method recited above.

The present invention can also be defined as a computer-implemented method of analyzing a MICR line in a digital image, comprising: scanning the MICR line in the digital image to identify MICR characters therein; in response to identified characters, determining positions along the MICR line in the digital image where other MICR characters should be; and analyzing each determined position of the MICR line in the digital image to try to identify the respective MICR character at that position. This may further comprise digitally removing horizontal and vertical lines detected in the MICR line and not part of a possible MICR character.

Still another definition of the method of the present invention is as a computer-implemented method for digitally recognizing a plurality of characters across an area of a digital image containing character indicia at predetermined positions in the area and also containing non-character indicia in the area. This definition includes: detecting indicia in the digital image and using a first template on the detected indicia to distinguish at least some character indicia from non-character indicia across the area; in response to the predetermined positions of the character indicia and the character indicia distinguished using the first template, determining positions in the area at which other character indicia should be located but are not distinguished using the first template; and using at least a second template on indicia detected at the determined positions to try to identify character indicia thereat.

The present invention also provides a check processing method comprising: transporting a check through a check sorter; generating electrical signals in response to sensing a MICR line on a check in the check sorter; generating a digital image of the check in the check sorter; determining in a programmed computer whether the electrical signals represent a valid or an invalid MICR line; and in response to determining that the electrical signals represent an invalid MICR line, digitally processing the digital image of the check to identify MICR characters therein. This method can further comprise determining in the programmed computer whether identified MICR characters constitute a valid MICR line, and if so, digitally changing stored MICR line data for the check.

The present invention also provides a check sorting system. This system comprises: a check sorter including a MICR reader and a digital imager for checks transported by the check responsive to the MICR reader; a database connected to the check sorter to provide a repository for digital images of checks provided from the digital imager; and a digital image analyzer connected to the controller and to the database to analyze by digital processing a check digital image from the database for a check indicated by the MICR interpreter of the controller to have an invalid MICR line.

The present invention also provides analyzer tools, which may be used in the aforementioned system. One definition of such a tool is as a financial item analyzer tool which comprises: means for applying character recognition processing to an invalidated MICR line in a digital image of a financial item; and memory means for containing in digitally encoded form the means for applying such that the means for applying is accessible by a digital computer.

The tool can also be defined as a check analyzer tool comprising: a detector to detect a digital image of a MICR line in a digital image of a check; and an image orienter, responsive to the detector, to change an orientation of the digital image of the check.

The check analyzer tool can also be defined as comprising: a first MICR font template to identify MICR characters; a missing MICR character position detector responsive to the first MICR font template to detect a position of a missing MICR character relative to at least one MICR character identified by the first MICR font template; and a second MICR font template responsive to the missing MICR character position detector to identify a MICR character in a position detected by the missing MICR character position detector. This tool can further comprise a third MICR font template responsive to the second MICR font template to identify a MICR character in a position detected by the missing MICR character position detector.

Therefore, from the foregoing, it is a general object of the present invention to provide a novel and improved automated analysis method and tool for a digitally imaged financial item, such as a check having a MICR line. It is also a general object of the present invention to provide a computer-implemented method for digitally recognizing a plurality of characters across an area of a digital image containing character indicia at predetermined positions in the area and also containing non-character indicia in the area. It is also a general object of the present invention to provide a check processing method and a check sorting system. Other and further objects, features and advantages of the present invention will be readily apparent to those skilled in the art when the following description of the preferred embodiments is read in conjunction with the accompanying drawings.

DETAILED DESCRIPTION OF THE INVENTION

The present invention broadly applies to digitally recognizing a plurality of characters across an area of a digital image containing character indicia at predetermined positions in the area and also possibly containing non-character indicia in the area. Character indicia is defined by one or more predetermined characteristics. Examples include characters for machine (e.g., computer) readable forms, such as characters detectable by optical character readers. Applications include, without limitation, test forms, income tax forms, postal items (e.g., addresses thereon), loan applications, etc. The preferred embodiments described below particularly refer to MICR characters, which have known predetermined forms and which are used at known predetermined locations on checks, for example.

One particular application of the digital recognition of the present invention is analyzing a MICR line (i.e., a line of characters in the font and material suitable for Magnetic Ink Character Recognition processing) in a digital image, such as analyzing MICR information on a financial item (e.g., deposit slips, cash tickets, batch tickets, block tickets). A specific example of this is with regard to a check that has undergone a sorting process in which the MICR line of the check has been read and a digital image of the check has been made. It will be in this specific context of check analysis that the preferred embodiments of the present invention will be described; however, broader aspects of the invention are not limited to just this context.

As mentioned in the background above, MICR lines used on checks in the United States are made from the MICR character symbol set including numerals 0 through 9, financial institution designation symbol 6 shown in FIG. 1, individual account number designation symbol 8 shown in FIG. 1, amount designation symbol 10 shown in FIG. 2, and a hyphen (not shown). On the check shown in FIG. 1, the two symbols 6 define the limits of portion 12 of the MICR line 4 within which the nine-digit financial institution identification number in MICR numerals (not shown) is preprinted on the check 2. The symbol 8 delimits to the right (as viewed in FIG. 1) portion 14 of the MICR line 4 within which the nine-digit individual account number in MICR numerals (not shown) is preprinted on the check 2. To the right (as viewed in FIG. 1) of the symbol 8 is portion 16 of the MICR line 4 in which the check number is preprinted in MICR format (not shown). During processing of the check subsequent to it being used by the account holder to draw on the holder's account, the symbols 10 and a ten-digit number in MICR format are printed in portion 18 of MICR line 4 shown in FIG. 2 to indicate the amount of the check (the number shown illustrates certain MICR numeral forms, and it represents a check amount of $525.00). The MICR line 4 is located in the lower one-half inch of conventional check 2.

In conventional check processing, an additional MICR line might be added to the check 2 below the conventional MICR line 4. This is illustrated by the reject repair strip 20 attached to the main check body as illustrated in FIG. 2. One form of this strip is five-eighths inch high; therefore, the MICR line on the strip 20 of this size is within what then becomes the bottom one-half inch of the check with the strip 20.

Figure 3:
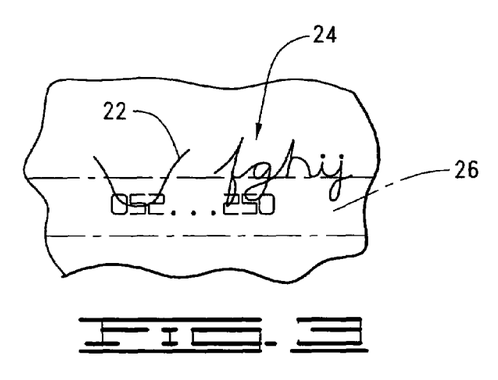
FIG. 3 illustrates markings into part of a MICR line, which markings may cause an invalidated MICR line read or at least create difficulty in trying to identify MICR characters from a digital image of the item.

Another aspect pertinent to the present invention is illustrated in FIG. 3. It was mentioned above that random marks 22 or letters 24 ("non-character" indicia relative to the desired MICR "character" indicia) impinging on MICR line 26 in FIG. 3 might be the cause of an invalidation of the MICR line. Whether this occurs during a MICR read, the markings 22, 24 do at least represent interference in analyzing a digital image for the MICR characters. That is, in a conventional MICR read process, the non-MICR markings might not interfere because the MICR reader senses magnetically; and if the non-MICR marks do not interfere magnetically, they will not likely result in invalidation of the MICR read. In a digital image of the check, however, both the MICR and non-MICR markings are merely digitally encoded pixel information representing lightness/darkness values (white or black in a two-tone scale). Thus, FIG. 3 illustrates one of the difficulties to be overcome in the analysis performed by the present invention; however, the present invention has application even if there are no interfering markings in the analyzed area.

Figure 4:
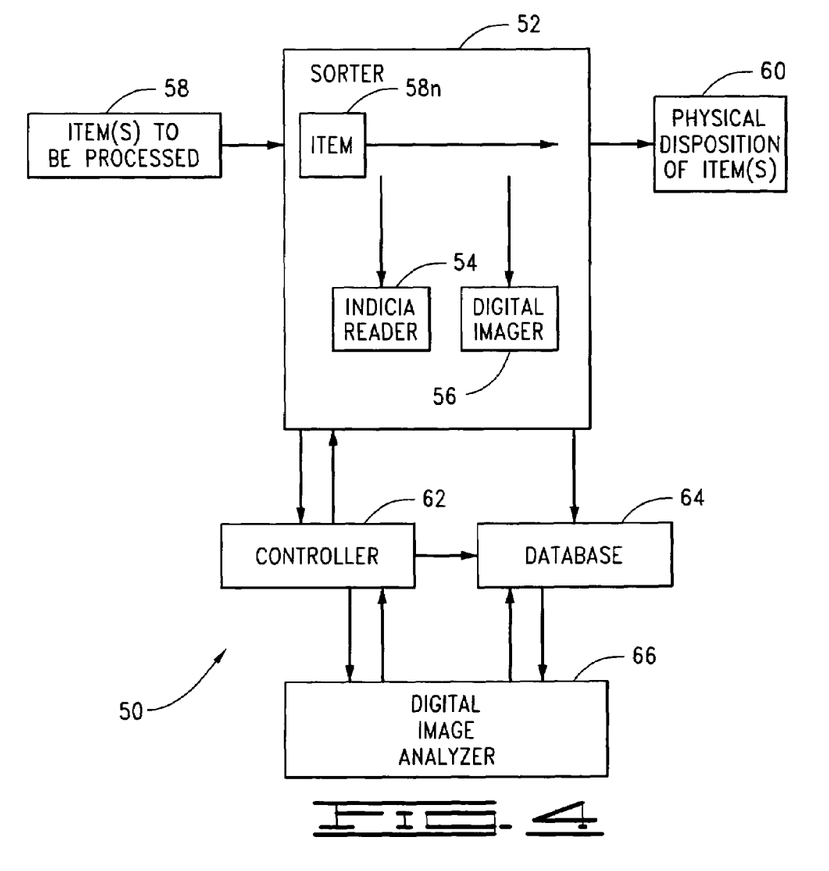
FIG. 4 is a block diagram of a preferred embodiment check sorter system of the present invention.

Referring to FIG. 4, there is illustrated a preferred embodiment of a financial item sorting system 50 in accordance with the present invention which is capable of overcoming the aforementioned difficulty regarding character versus non-character recognition if such interference exists. One specific application of the system 50 is as a check sorting system.

The sorting system 50 includes a sorter 52. The sorter 52 includes a MICR reader 54 and a digital imager 56. Items 58 to be processed (e.g., checks) are loaded into an input bin of the sorter 52, and the sorter 52 physically transports each item $58_n$ through the sorter to an output location, referred to as pockets in a particular type of check sorter, from which the items 58 are physically disposed (e.g., bundled and sent to respective financial institutions) as indicated at reference numeral 60 in FIG. 4.

When an item $58_n$ is moved through the sorter 52, the MICR reader 54 senses magnetic characters on the item and generates electrical signals, which are communicated to a controller 62, where the signals may be used to store digitally encoded MICR line data representing MICR characters detected in the MICR line read by the MICR reader 54. Also during this movement of an item $58_n$, the digital imager 56 generates electrical signals which are communicated to a database 64 in which responsive digitally encoded signals are stored in a computer memory providing a repository of the digital images for all the processed items. Associated (either physically within a common computer or memory thereof, or at least by some identifier linking the two for retrieval when searches of respective encoded MICR line data and encoded digital image databases are made) with the digital images in the database 64 is the information obtained from the MICR reader 54 as communicated to the controller 62. Thus, the act of running a document through a check sorter generates two distinct sets of data; the first is a character representation of the MICR line, and the second is a digital image representation of the entire check.

The controller 62 of the preferred embodiment includes a programmed computer which applies a predetermined set of rules to the MICR line data from the reader 54. Compliance or non-compliance with the rules determines whether the read MICR line is validated or invalidated. Examples of possible rules include: is the bank number valid, does the account number self-check, is the amount exactly ten digits long, is the account number valid. A "flag" bit (or bits) associated with the MICR line data for the respective check may be set or not set to indicate the validation/invalidation determination, or other indicators may be used.

The foregoing components are implemented and function in the preferred embodiment using conventional equipment and in known manner. Examples for the sorter 52 include check sorting equipment manufactured by Banctec Inc. (e.g., E Series transports, TRACE transports), Unisys (e.g., NDP series transports), or IBM (3890 Document Processors). An example for the controller 62 and the database 64 includes known equipment using ImageVision brand software from Advanced Financial Solutions, Inc.

Added to the foregoing in the present invention is a digital image analyzer 66 connected to the controller 62 and to the database 64. Such "connection" can be in any suitable manner (e.g., included in programming of the controller 62 or in separate equipment communicating with the controller 62 and the database 64). In whatever form, the analyzer 66 converts a digital representation of the respective image from the database 64 to a common image format, such as TIFF, JPEG or ABIC, and writes the data to its own database or computer file. The digital image analyzer 66 does this, and then it analyzes the digital image using digital processing. More particularly, the digital image analyzer 66 receives or retrieves from the controller 62 one or more control signals (e.g., the set or not set status of the aforementioned MICR line data flag) informing the analyzer 66 of an at least initially indicated invalidated item passing through the sorter 52; depending on the speed of the sorter 52, for example, this may occur in real time so that the analyzer 66 can take part in the validation/invalidation determination, or it may occur after that determination has been otherwise made (e.g., based on only the input received from the reader 54). When the digital image analyzer 66 is to perform its function, it sends one or more control signals to the database 64 to retrieve the respective digital image for that processed item such as described above. The analyzer 66 then analyzes the resulting digital image; and if in doing so the analyzer 66 determines by its own programming that it has found a MICR line in the digital image, the analyzer 66 notifies the controller 62 of this and sends its MICR line data to the controller 62. After receiving this from the analyzer 66, the controller 62 applies its set of rules (in the preferred embodiment, the same rules as were applied to the data from the reader 54) to determine if the MICR line data from the analyzer represents a valid MICR line. If it is a valid MICR line, the controller 62 writes that data to the MICR data record for the respective imaged item to replace the original invalidated data.

Figure 5:
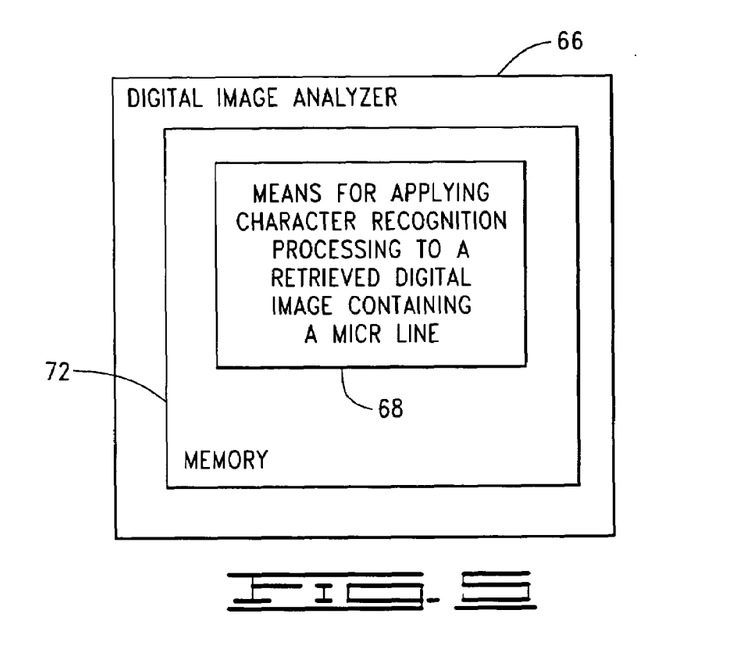
FIG. 5 is a block diagram of a preferred embodiment of the digital image analyzer tool of the system shown in FIG. 4.

A preferred embodiment of the digital image analyzer 66 is represented in FIG. 5. This provides a financial item analyzer tool which itself is inventive as well as being a part of the overall system 50 represented in FIG. 4. This tool includes means 68 for applying character recognition processing to the retrieved digital image of the item. This preferably includes, for the check or other MICR character containing item of the illustrative context, means for distinguishing MICR characters from a combination of the MICR characters and interfering marks (e.g., the interfering marks illustrated in FIG. 3), if any. A particular implementation of the means 68 includes a machine useable form of the computer programs appended hereto.

FIG. 5 shows that the means 68 is in memory means 72 for containing in digitally encoded form the means for applying such that the means is accessible by a digital computer, such as the computer implementing the controller 62. The memory means 72 can be implemented in any suitable manner. One example is in a memory of the one or more computers in which the controller 62, the database 64 and the digital image analyzer 66 may be implemented. Another example is as a portable memory device (e.g., a diskette) by which the means for applying can be physically transferred from one location to another. Another example of a suitable memory is a suitable storage device or system permitting remote access from a storage or retrieval facility, such as via the Internet or other telecommunications link.

Figure 6:
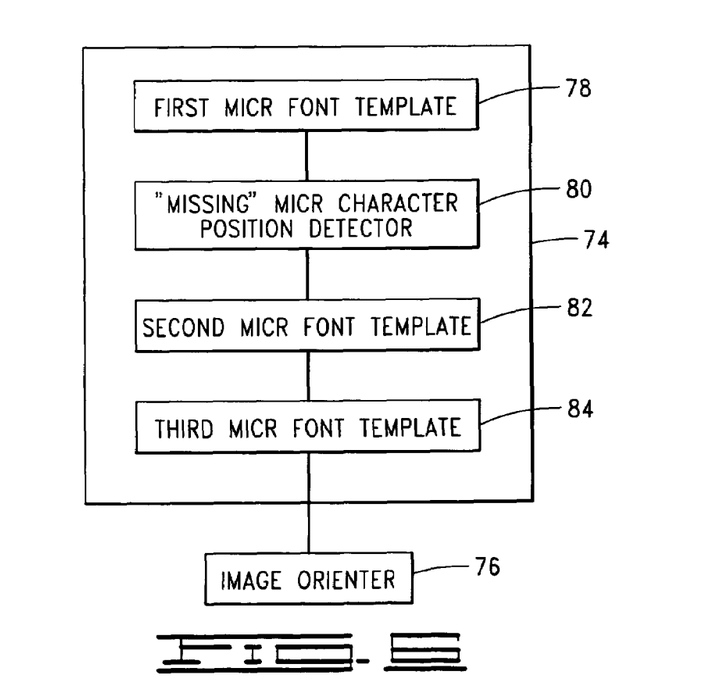
FIG. 6 is a block diagram of a preferred embodiment of the means for applying character recognition processing to an invalidated MICR line in a digital image shown in FIG. 5.

A preferred embodiment of the means 68 represented in FIG. 5 is shown in FIG. 6. This embodiment is as a means for applying character recognition processing to an invalidated (or potentially invalidated if the means is operating in real time in conjunction with the controller 62 to make that determination) MICR line in the digital image, and it includes a detector 74 to detect a digital image of a MICR line in the retrieved digital image for the respective item under analysis. The means 68 further includes in the preferred embodiment an image orienter 76 which changes an orientation of the digital image if the detector 74 is unable to detect a digital image of the MICR line in at least the initial orientation of the digital image. The detector 74 and the orienter 76 are implemented using computer programming code (see appended program for a particular implementation) that controls the computer with which it is used to find a MICR line in the converted retrieved digital image used by the analyzer 66.

This implementation of the detector 74 looks at the bottom one-half inch of the item (via the retrieved digital image thereof) and the MICR recognition process commences. If results are good, then the detector 74 has found the MICR line in the digital image. If not, the orienter 76 part of the program causes the upper one-half inch of the image to be rotated, and then it is searched as described above by the detector 74. If no suitable result is obtained, the orienter 76 causes the back of the document image to be searched by the detector 74, first in the low one-half inch, then the top one-half inch if needed. Once a MICR line is found, a high scan is performed five-eighth inch above the identified line; if another MICR line is found here, the item is deemed to be a "stripped" item (e.g., such as in FIG. 2 with strip 20 included), or enclosed in a document carrier having an integral strip, which is similar to the strip shown in FIG. 2. If a change in image orientation is required to find the MICR line, the means 68 of the preferred embodiment may set a "flag" in a header of the image to indicate proper orientation (normal, upside-down, backwards, backwards and upside-down). The image itself is not changed.

The detector 74 of the preferred embodiment includes at least a first MICR font template 78 which works with the area of the item under review (e.g., the respective one of the aforementioned one-half inch high areas in which the MICR line is considered to exist in a check). The first MICR font template 78 is used to identify MICR characters across the length of the selected area of the digital image. For this processing, the preferred embodiment of the detector 74 also includes a "missing" MICR character position detector 80. If the first MICR font template 78 is unable to identify each MICR character at all the possible positions for such characters in the MICR line, the position detector 80 detects the positions of those missing MICR characters relative to at least one MICR character identified by the first MICR font template 78. Further in this preferred embodiment, the detector 74 includes at least a second MICR font template 82 which responds to the missing MICR character position detector 80 by trying to identify a MICR character in a position detected by the detector 80. In the preferred embodiment of FIG. 6, a third MICR font template 84 is used to try to identify a MICR character in a position detected by the detector 80 if the second MICR font template 82 is unable to do so. Particular implementations of software for implementing these are included in the appended programs.

Figure 7:
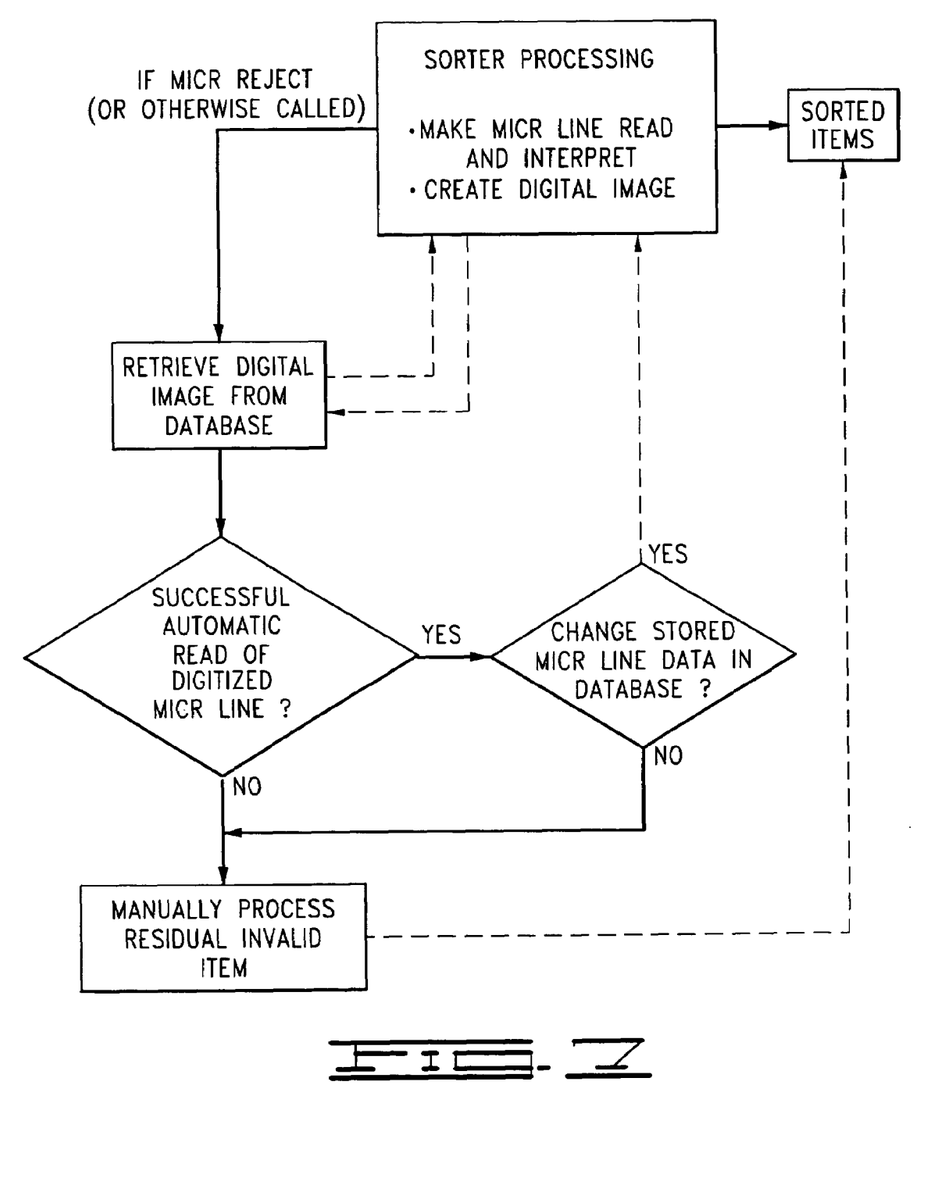
FIG. 7 is a flow diagram of a preferred embodiment of a financial item processing method of the present invention.

In performing the method of the present invention by using the sorting system 50 of FIGS. 4–6, the items 58 are processed through the sorter 52 in conventional manner, namely, sensing the item for a MICR line and characters therein and creating a digital image of the processed item $58_n$ as indicated in FIG. 7. The foregoing occur while physically moving or transporting the item through the sorter 52. Respective electrical signals referred to above are generated and communicated to the controller 62 and the database 64, respectively. The programmed computer implementing the controller 62 determines in known manner whether the electrical signals from the MICR reader 54 represent a valid or an invalid MICR line (this may or may not occur in conjunction with use of the analyzer 66 as referred to above). If the method of the present invention is called upon because of the controller 62 determining that there is an invalid MICR line, the method includes digitally applying character recognition processing to the invalidated MICR line in the digital image of the processed item. Physical items 58 are sorted in known manner at the output of the sorter process as also indicated in FIG. 7.

As further indicated in FIG. 7, if an item is rejected due to the interpretation by the controller 62 that the MICR line is invalid, the method of the present invention continues as shown in FIG. 7. This includes retrieving the respective digital image from the database 64 and converting it to a useable form (if not already in such form) as described above. Preferably such form includes at least a 200 dots per inch (DPI) image in a suitable format, such as TIFF, JPEG or ABIC; any suitable microcomputer system, such as the current Pentium based systems running Windows NT, may be used in implementing or performing this. Such computer programmed in accordance with the present invention (e.g., with the appended programs) reads the digital image off of its hard disk, decompresses the image in memory, and tries to read the MICR line, possibly reading all four areas of the document (front bottom, front top, back bottom, back top) as described above and further explained below.

Once the digital image has been retrieved from the database, an automatic read is made of the selected area(s) as indicated in FIG. 7. This will be further described below with reference to FIGS. 8 and 9; however, if such automatic read is successful, the controller 62 is notified and it determines whether the successful read constitutes a valid MICR line (of course, this can be performed in the analyzer 66 or elsewhere, the main function being that an automated determination is made as to whether there is now valid MICR line data). If, on the other hand, the automatic read is not successful, or there is a successful read but it does not constitute a valid MICR line, that item remains invalidated and is left for subsequent processing, such as in FIG. 7 by manually processing as a residual invalid item in the same manner as invalidated items have heretofore been manually processed as described in the background portion of this specification. Although some residual invalid items may remain after use of the method or system of the present invention, any such residual invalid items should be significantly fewer than there were initial invalidated items processed by the present invention, whereby the aforementioned advantages of the invention are obtained.

Figure 8:
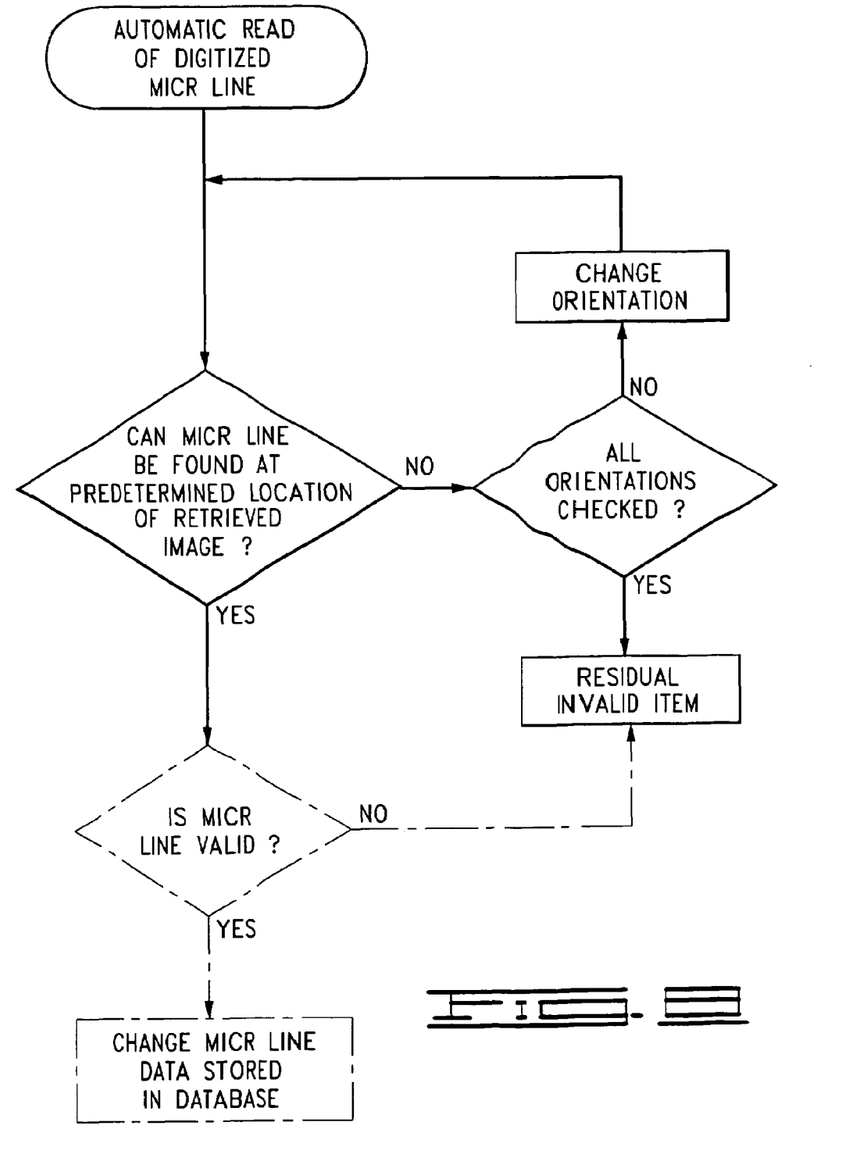
FIG. 8 is a flow diagram of a preferred embodiment of an automatic financial item analysis method of the present invention, which also forms part of the method represented in FIG. 7.

Referring to FIG. 8, the automatic reading to find or detect the digital image of the MICR line of the invalidated item, in the preferred embodiment of this illustration, uses the financial item analysis method of the present invention. This includes digitally applying character recognition processing to the respective digital image of the financial item, and preferably to the invalidated MICR line in the illustrative context being referred to. This more specifically includes digitally processing such digital image of the item to identify MICR characters and thereby to find a digital image of the MICR line in the digital image of the item. Thus, the first indicated decision of the preferred embodiment in FIG. 8 determines whether the MICR line can be found at a predetermined location of the retrieved image. If it cannot be found, the method continues as shown in FIG. 8 by determining whether all orientations of the digital image have been checked. If they have not, the orientation is changed by digital processing and the reoriented digital image is checked to see if the MICR line can then be found. If all the orientations have been checked in the manner described in more detail above and still the MICR line cannot be found, the method of the present invention concludes that the invalidated item remains a residual invalid item as indicated in FIG. 8.

If the foregoing results in MICR characters being identified, the automatic read method illustrated in FIG. 8 then determines whether that constitutes a MICR line. This is determined by the method's own parameters for defining what constitutes a MICR line (e.g., some minimum number of MICR characters being identified). If what has been read is not deemed a MICR line, the item becomes a residual invalid item. If the MICR line is deemed to have been read, one or more signals are generated for notifying the controller 62 (for the illustrated embodiment) and the digitally encoded MICR line data is analyzed to determine whether it constitutes a valid MICR line. As referred to above, in the illustrated embodiment this is performed in the controller 62 using the controller's known predetermined rules for validating MICR reads; however, such determination can be made in any other suitable manner. A preferred embodiment regarding whether the MICR line can be read, such as using the analyzer 66, will be described with reference to FIGS. 9–11.

Figure 9:
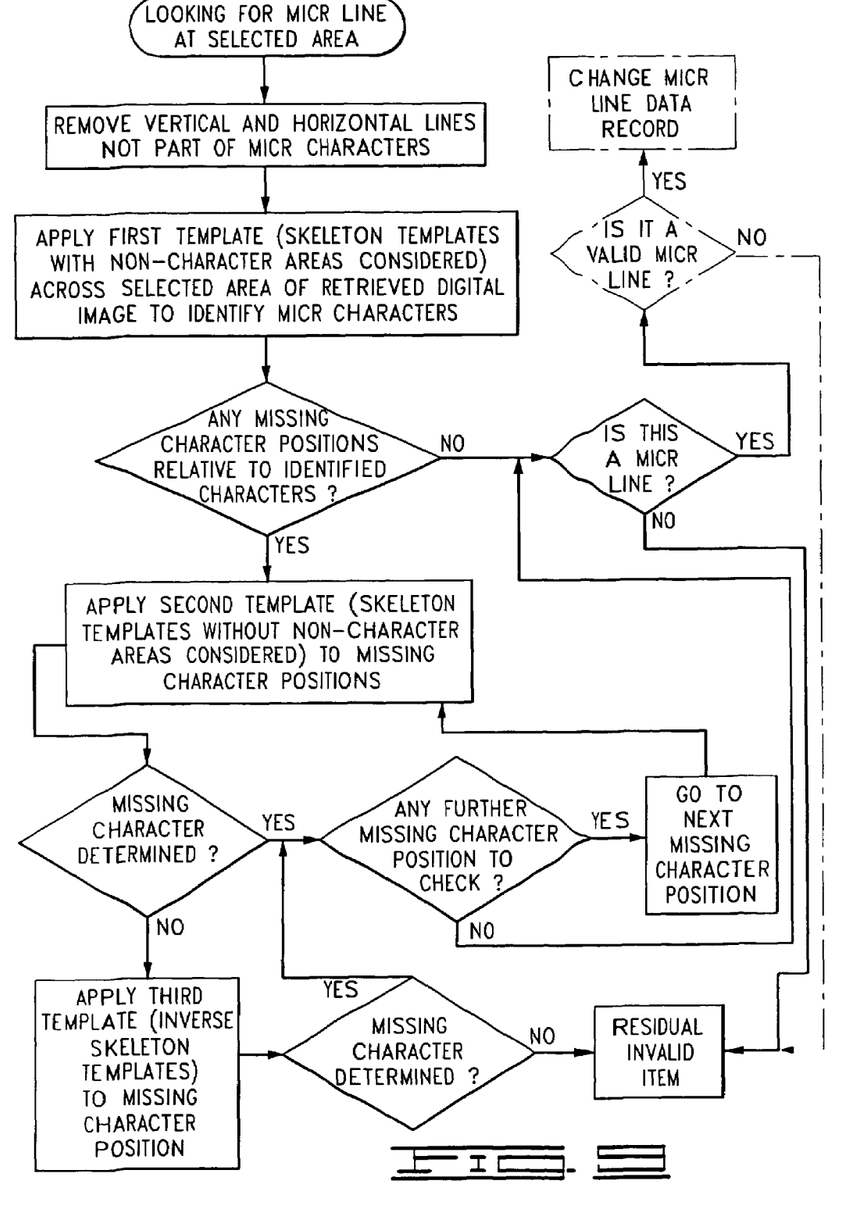
FIG. 9 is a flow diagram of a particular implementation of an automatic financial item analysis method of the present invention, which may be used with regard to whether the MICR line can be read in the method represented in FIG. 8.

A preferred embodiment of the method for finding or detecting a MICR line in accordance with the present invention is represented in FIG. 9. In the preferred embodiment, vertical and horizontal lines not part of MICR characters are removed. These are digitally removed by digitally distinguishing non-character indicia representing horizontal and vertical lines detected in the area of the digital image. This can be done by a number of means, but one particular implementation simply scans in two directions looking for connected black pixels. First, horizontal scans are performed for the entire length of the check within the selected search area, and any consecutive black pixels that exceed one-fourth inch in length are removed from the image (by setting their values to an invalid value). Then, vertical scans are performed in the same fashion, and any connected pixels that exceed one-fifth inch long are removed from the image (by setting their values to an invalid value). In the specific implementation using the appended programs, white pixels are represented by zeroes, black pixels by ones, and removed lines by twos. The character search will not allow a "two" to be a valid internal pixel for a MICR character.

Figure 10:
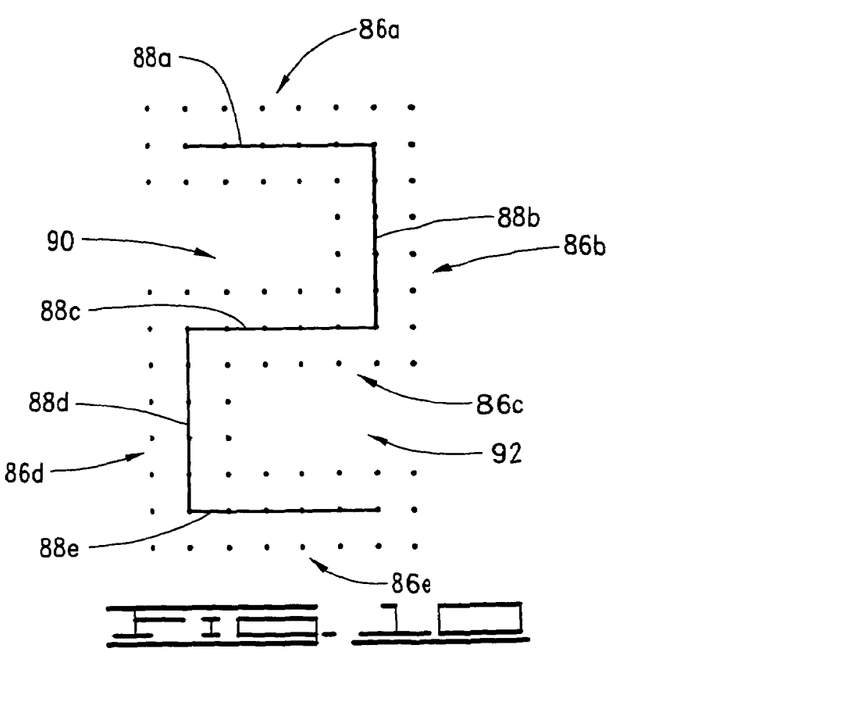
FIG. 10 illustrates a simplified version of the MICR numeral "2" and one embodiment of a skeleton template for the numeral.
Figure 11:
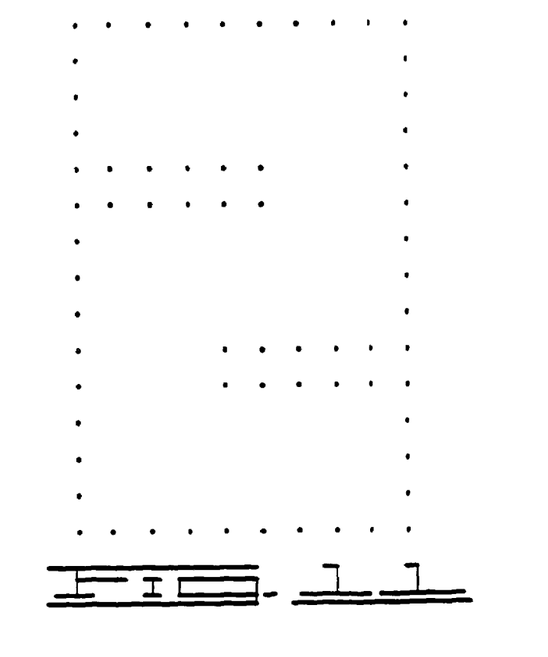
FIG. 11 illustrates a simplified version of one embodiment of a template for the inverse of the template represented in FIG. 10.

Once vertical and horizontal lines have been removed, a first MICR font template is used to identify MICR characters across the length of the selected area being searched for the MICR line. In a particular implementation, respective skeleton templates for the possible MICR characters are used. The method scans the MICR area from left to right and top to bottom looking for black pixels having at least five neighboring black pixels. These are deemed "good" pixels because being in such a neighborhood of other black pixels and located within the template skeleton region, they could be a MICR character. The number of these "good" pixels are added and from that there is subtracted "bad" black pixels detected in regions of the character font template which should be "white" or empty pixels. If the sum of the "good" pixels minus the "bad" pixels exceeds a threshold, then the method considers that the respective MICR character has been identified. An example of a skeleton template for the MICR character "2" is illustrated in FIG. 10 in a simplified manner in which the MICR character is represented by three-pixel wide lines 86a–86e. The skeleton of the template includes the pixels shown connected by solid lines 88a–88e in FIG. 10. "Bad" pixels would be any black pixels detected in the blank areas 90, 92 shown in FIG. 10. Once a pixel is found to be contained in a five-pixel neighborhood, the top left of a respective character skeleton template is effectively overlaid on the image at that point, and the matching pixels that are black are counted, and the pixels that are "bad," or not supposed to be black, are subtracted from the total. If one skeleton template does not "fit," another one is tried and so on until one of these skeleton templates fits or these skeleton templates for all the MICR characters have been tried.

Continuing in FIG. 9, the method next determines whether there are any "missing" character positions between characters which have been identified in response to using the first MICR font template. That is, since a MICR line has a predetermined format (such as illustrated in FIGS. 1 and 2) and if the first template (i.e., any one of the first-used skeleton templates using "good" and "bad" pixels) is able to identify at least one of the characters in this line, other positions relative to the identified character(s) can be determined where MICR characters should be but presently are "missing" because they were not detected by the first MICR font template. For example, consecutive MICR characters, such as those found in the amount field 18 encoding, are spaced exactly 0.12 inch apart. As a result of the first template pass, certain characters are identified and their positions noted. From these known positions, areas spaced 0.12 inch to the right or left are searched for a density of black pixels (at 200 DPI, 90 black pixels is a good number to search for, for example). If the number of pixels set in this area exceeds this value, then a possible "missing" character has been found, and a relaxed template searching algorithm commences (see below with regard to a second and possibly a third template). In this fashion, the image is "self-segmented" into character regions after the entire selected area was first scanned using the first template. If a character is identified next to a known good character, the process repeats itself with this new position as a reference until either a blank area or another known character is identified.

If there are no missing character positions between determined characters, all characters presumably have been read; and the method determines if those characters define a MICR line. If not, the item is a residual invalid item. If it is determined to be a MICR line, then a determination is made as to whether it is a valid MICR line. The foregoing are performed as described above.

If there are missing character positions between determined characters, the method illustrated in FIG. 9 applies a second MICR font template to identify the MICR character in the detected position. In the particular implementation represented in FIG. 9, the same skeleton templates as referred to above with regard to the first MICR font template are applied except in a "relaxed" manner wherein there is no subtraction made for "bad" pixels (i.e., the non-character areas, such as areas 90 and 92 in FIG. 10, are not considered). If the sum of the "good" pixels exceeds a predetermined threshold, the missing character is thereby identified by the respective character represented by that respective skeleton template. In the first template application in this implementation, the sum of the good minus the bad must be greater than 96 percent of a possible "perfect" score, which would consist of every possible black pixel being set and no "bad" pixels being set (black). When the "relaxed" version of the template is attempted, simply 87 percent of the black pixels must be set, with no regard for possible "bad" pixels. Since this template search is restricted to a small area where a possible character may be by prior black pixel density detection, the error rate for this procedure is made effectively small.

If the use of the second MICR font template does not successfully identify a character at a respective position, a third MICR font template is applied in the particular implementation of FIG. 9. This is an inverse skeleton which is the inverse of the skeleton templates used in the first and second MICR font templates (see FIG. 11 as an example of such inverse for the illustration of FIG. 10, wherein the originally "white" dots become "black" and the originally "black" dots become "white" and with a rectangular border of "black" dots around it). The inverse template requires all the identified "black" pixels in a region to fit "inside" the template, and any pixels that are not supposed to be black are discounted. In the specific implementation of the appended programs, only two pixels are allowed to be black that should not be. This method is particularly useful for identifying "broken" characters where parts of the character are missing, and would cause the prior two template processes to fail.

If the missing character is still not determined, the item becomes, in this embodiment of the method, a residual invalid item as indicated in FIG. 9. If the missing character is determined by either the second MICR font template or the third MICR font template, the method checks to see if there is any further missing character position to check. If not, all the characters presumably have been identified and the data validation steps represented in FIG. 9 are performed. If there are further missing characters, the method goes to the next position and repeats the use of the second and third MICR font templates as needed and as indicated in FIG. 9.

If the result of the foregoing is that a valid MICR line has been found, the encoded MICR line data for the item being analyzed is digitally modified in the appropriate database by writing the data from the aforementioned character detection process into the appropriate storage locations in the database, whereby the MICR line data file contains all the correct, identified MICR characters. With regard to the digital image of the item, it is not changed, but simply an orientation identifier is altered if reorienting was required to find the MICR line in the image. For example, using the TIFF image format, there is an image "orientation" tag. This is simply altered to indicate the proper orientation of the image. Any software displaying this image would look at the "orientation" tag and rotate the image to the proper format before display.

The method of the present invention can be more broadly stated as a computer-implemented method of analyzing a MICR line in a digital image. This method comprises scanning the MICR line in the digital image to identify MICR characters therein; in response to identified characters, determining positions along the MICR line in the digital image where other MICR characters should be; and analyzing each determined position of the MICR line in the digital image to try to identify the respective MICR character at that position. A preferred embodiment of this method uses the aforementioned steps shown in FIG. 9.

Another definition of the present invention as supported by the foregoing disclosure is as a computer-implemented method for digitally recognizing a plurality of characters across an area of a digital image containing character indicia at predetermined positions in the area and also containing non-character indicia in the area. This method comprises detecting indicia in the digital image (e.g., the black pixels) and using a first template on the detected indicia to distinguish at least some character indicia from non-character indicia across the area. This method also includes, in response to the predetermined positions of the character indicia and the character indicia distinguished using the first template, determining positions in the area at which other character indicia should be located but are not distinguished using the first template. This method further comprises using at least a second template on indicia detected at the determined positions to try to identify character indicia thereat. This can further comprise digitally distinguishing non-character indicia representing horizontal and vertical lines detected in the area of the digital image.

Thus, the preferred embodiments of the analysis method and tool of the present invention apply character recognition processing first to the entire area under analysis to determine at least one of the predetermined characters. With this determination, the method then self-segments by identifying individual positions where other characters should be located given the predetermined format for the area under examination and the previously determined character(s). At each such position, at least one other analysis is made to determine whether the character can be identified. If all such characters can be identified with regard to an invalidated-MICR-line check, for example, the invalidated check becomes a validated one and stored MICR line data for the check can be repaired by digitally inserting the respective characters in the respective positions of the stored data. This automated process can greatly reduce manual processing heretofore required in trying to validate checks which have been automatically processed and determined to be invalid.

In the appended program listings, "micrread.cpp" is C++ source code used in a specific implementation of the invention as a programmer's toolkit module and "micrfont.h" is the C++ representation of a particular implementation of the template skeletons and the inverse templates for both a 200 DPI and a 240 DPI implementation.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A financial item analysis method, comprising digitally applying character recognition processing to an invalidated MICR line in a digital image of a financial item after the financial item has been sent to a reject pocket of a financial item sorter; and, digitally processing the digital image of the financial item having an invalidated MICR line to locate and identify MICR characters therein.

2. A financial item analysis method as defined in claim 1, further comprising processing a check as the financial item through a check sorter implementing the financial item sorter, including sensing the check for a MICR line and characters therein, determining the check has an invalidated MICR line, and creating a digital image of the check, and thereafter performing the digitally applying character recognition processing to the invalidated MICR line in the digital image of the check after the check has been sent to the reject pocket.

3. A financial item analysis method as defined in claim 2, further comprising changing digitally stored MICR line data for the check in response to digitally applying character recognition processing to the invalidated MICR line in the digital image of the check.

4. A financial item analysis method as defined in claim 1, further comprising changing digitally stored MICR line data for the financial item in response to digitally applying character recognition processing to the invalidated MICR line in the digital image of the financial item.

5. A financial item analysis method as defined in claim 1, wherein digitally applying character recognition processing to an invalidated MICR line in a digital image of a financial image includes:
digitally processing the digital image of the financial item to search for a digital image of the invalidated MICR line of the financial item; and
using digital processing to digitally change the orientation of the digital image of the financial item in response to at least one failure of the digitally processing of the digital image of the financial item to find a digital image of the MICR line.

6. A financial item analysis method as defined in claim 5, further comprising changing digitally stored MICR line data for the financial item in response to digitally applying character recognition processing to the invalidated MICR line in the digital image of the financial item.

7. A financial item analysis method as defined in claim 5, wherein digitally processing the digital image of the financial item to search for a digital image of the invalidated MICR line of the financial item includes:
using a first MICR font template to identify MICR characters across the length of a selected area of the digital image of the financial item;
detecting a position for a MICR character not identified by the first MICR font template relative to at least one MICR character identified by the first MICR font template; and
in response to detecting a position for a MICR character not identified by the first MICR font template, using a second MICR font template to identify the MICR character in the detected position.

8. A financial item analysis method as defined in claim 7, further comprising changing digitally stored MICR line data for the financial item in response to digitally applying character recognition processing to the invalidated MICR line in the digital image of the financial item.

9. A financial item analysis method as defined in claim 1, wherein digitally applying character recognition processing to an invalidated MICR line in a digital image of a financial image includes:
using a first MICR font template to identify MICR characters across the length of a selected area of the digital image of the financial item;
detecting a position for a MICR character not identified by the first MICR font template relative to at least one MICR character identified by the first MICR font template; and
in response to detecting a position for a MICR character not identified by the first MICR font template, using a second MICR font template to identify the MICR character in the detected position.

10. A financial item analysis method as defined in claim 9, further comprising changing digitally stored MICR line data for the financial item in response to digitally applying character recognition processing to the invalidated MICR line in the digital image of the financial item.

11. A check processing method, comprising:
transporting a check through a check sorter;
generating electrical signals in response to sensing a MICR line on a check in the check sorter;
generating a digital image of the check in the check sorter;
determining in a programmed computer whether the electrical signals represent a valid or an invalid MICR line; and
in response to determining that the electrical signals represent an invalid MICR line, and off-line from the check sorter and the transporting of the check, digitally processing the digital image of the check to identify MICR characters therein.

12. A check processing method as defined in claim 11, further comprising determining in the programmed computer whether identified MICR characters constitute a valid MICR line, and if so, digitally changing stored MICR line data for the check.

13. A check processing method as defined in claim 11, wherein digitally processing the digital image of the check includes using digital processing to digitally change the orientation of the digital image of the check in response to at least one failure of the digitally processing of the digital image of the check to find a digital image of the invalid MICR line.

14. A check processing method as defined in claim 13, further comprising determining in the programmed computer whether identified MICR characters constitute a valid MICR line, and if so, digitally changing stored MICR line data for the check.

15. A check processing method as defined in claim 13, wherein digitally processing the digital image of the check further includes:
using a first MICR font template to try to identify MICR characters across the length of a selected area of the digital image of the check;
detecting a position for a MICR character not identified by the first MICR font template relative to at least one MICR character identified by the first MICR font template; and
in response to detecting a position for a MICR character not identified by the first MICR font template, using a second MICR font template to try to identify the MICR character in the detected position.

16. A check processing method as defined in claim 15, further comprising determining in the programmed computer whether identified MICR characters constitute a valid MICR line, and if so, digitally changing stored MICR line data for the check.

17. A check processing method as defined in claim 11, wherein digitally processing the digital image of the check includes:
using a first MICR font template to try to identify MICR characters across the length of a selected area of the digital image of the check;
detecting a position for a MICR character not identified by the first MICR font template relative to at least one MICR character identified by the first MICR font template; and
in response to detecting a position for a MICR character not identified by the first MICR font template, using a second MICR font template to try to identify the MICR character in the detected position.

18. A check processing method as defined in claim 17, further comprising determining in the programmed computer whether identified MICR characters constitute a valid MICR line, and if so, digitally changing stored MICR line data for the check.

19. A check sorting system, comprising:
a check sorter including a MICR reader and a digital imager for checks transported by the check sorter;
a controller connected to the check sorter, the controller including a MICR interpreter responsive to the MICR reader;
a database connected to the check sorter to provide a repository for digital images of checks provided from the digital imager; and
a digital image analyzer connected to the controller and to the database to analyze by off-line digital processing a check digital image from the database for a check indicated by the MICR interpreter of the controller to have an invalid MICR line, wherein the off-line digital processing occurs after the check sorter has completed transporting the respective check.

20. A check sorting system as defined in claim 19, wherein the digital image analyzer includes means for applying character recognition processing to an invalidated MICR line in the check digital image.

21. A check sorting system as defined in claim 19, wherein the digital image analyzer includes:
a detector to detect a digital image of a MICR line in the check digital image; and
an image orienter, responsive to the detector, to change an orientation of the check digital image.

22. A check sorting system as defined in claim 21, wherein the detector includes:
a first MICR font template to identify MICR characters;
a missing MICR character position detector responsive to the first MICR font template to detect a position of a missing MICR character relative to at least one MICR character identified by the first MICR font template; and
a second MICR font template responsive to the missing MICR character position detector to identify a MICR character in a position detected by the missing MICR character position detector.

23. A check sorting system as defined in claim 19, wherein the digital image analyzer includes:
a first MICR font template to identify MICR characters;
a missing MICR character position detector responsive to the first MICR font template to detect a position of a missing MICR character relative to at least one MICR character identified by the first MICR font template; and
a second MICR font template responsive to the missing MICR character position detector to identify a MICR character in a position detected by the missing MICR character position detector.

24. A check processing method, comprising:
transporting a check through a check sorter including a MICR reader and a digital imager;
generating electrical signals with the MICR reader in response to the MICR reader sensing a MICR line on a check in the check sorter and communicating the electrical signals to a controller including a programmed computer to define a first set of data;
generating with the digital imager a digital image of the check in the check sorter and communicating the digital image to a database to define a second set of data;
determining in the programmed computer, using the first set of data and a predetermined set of MICR line validation rules digitally stored in the programmed computer, whether the electrical signals represent a valid or an invalid MICR line;
in response to determining that the electrical signals represent an invalid MICR line, transporting the check to a reject pocket preparatory to manual processing of the check by key entry personnel;
off-line from the check sorter and after transporting the check to the reject pocket but before a time for manual processing of the check by key entry personnel, digitally processing, using the second set of data, the digital image of the check to identify MICR characters therein, including: digitally converting a digital representation of the digital image from the second set of data to a common image format;
digitally applying templates to the converted data in the common image format to determine MICR characters in the MICR line represented in the converted data;
determining in the programmed computer, using the predetermined set of MICR line validation rules, whether the determined MICR characters represent a valid or invalid MICR line; and
writing the determined MICR characters to the first set of data in response to determining that the determined MICR characters represent a valid MICR line, thereby obviating the need for manually processing the check by key entry personnel.

25. A check processing method, comprising:
transporting a check through a check sorter including a MICR reader and a digital imager;
generating electrical signals with the MICR reader in response to the MICR reader sensing a MICR line on a check in the check sorter and communicating the electrical signals to a controller including a programmed computer to define a first set of data;
generating with the digital imager a digital image of the check in the check sorter and communicating the digital image to a database to define a second set of data;
determining in the programmed computer, using the first set of data and a predetermined set of MICR line validation rules digitally stored in the programmed computer, whether the electrical signals represent a valid or an invalid MICR line;
in response to determining that the electrical signals represent an invalid MICR line, transporting the check to a reject pocket preparatory to manual processing of the check by key entry personnel;
off-line from the check sorter and after transporting the check to the reject pocket but before a time for manual processing of the check by key entry personnel, digitally processing, using the second set of data, the digital image of the check to identify MICR characters therein, including:
digitally determining MICR characters in the MICR line represented in the second set of data;
determining whether the determined MICR characters represent a valid or invalid MICR line; and
writing the determined MICR characters to the first set of data in response to determining that the determined MIICR characters represent a valid MICR line, thereby obviating the need for manually processing the check by key entry personnel.

26. A financial item analysis method, comprising automatically digitally applying character recognition processing to locate and identify MICR characters in an invalidated MICR line in a digital image of a financial item after the financial item has been sent to a reject pocket of a financial item sorter.

* * * * *